No. 785,600. PATENTED MAR. 21, 1905.
M. EKENBERG.
METHOD OF DRYING PASTY SUBSTANCES.
APPLICATION FILED FEB. 10, 1903.
2 SHEETS—SHEET 1.
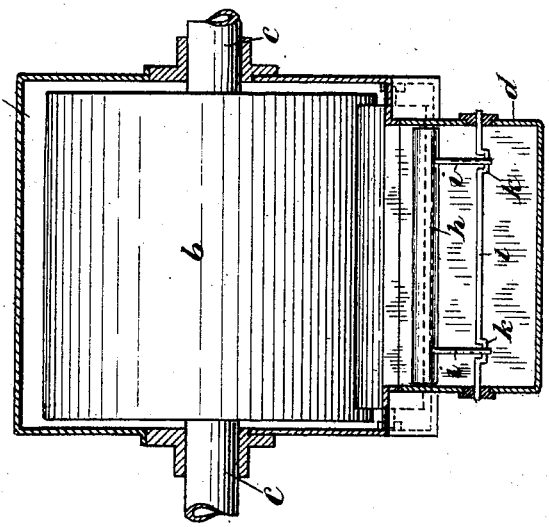
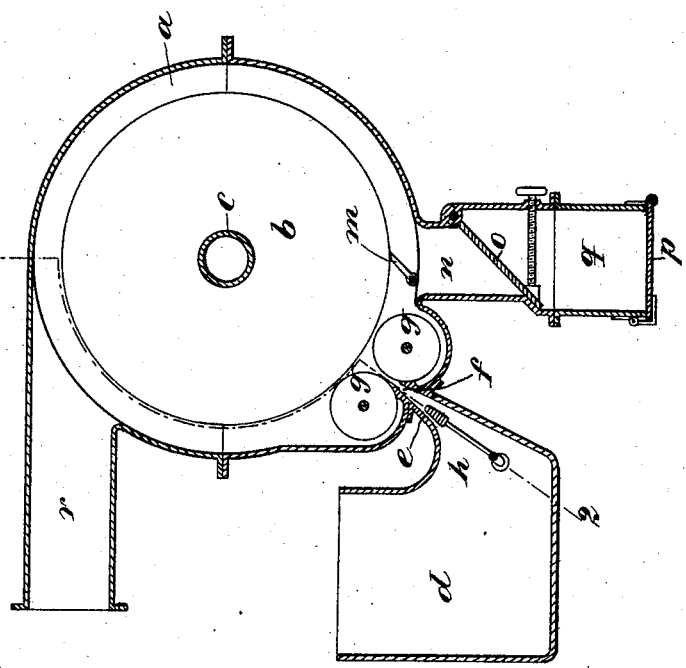
WITNESSES:
INVENTOR
Martin Ekenberg
BY
ATTORNEY No. 785,600. PATENTED MAR. 21, 1905.
M. EKENBERG.
METHOD OF DRYING PASTY SUBSTANCES.
APPLICATION FILED FEB. 10, 1903.
2 SHEETS—SHEET 2.
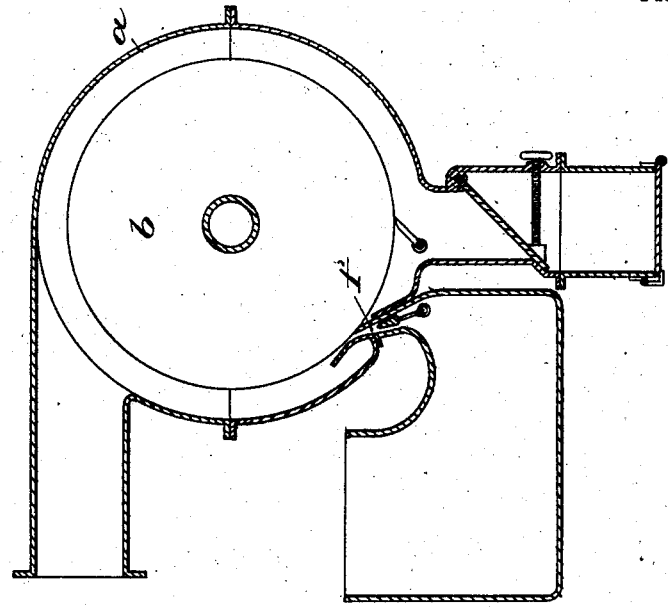
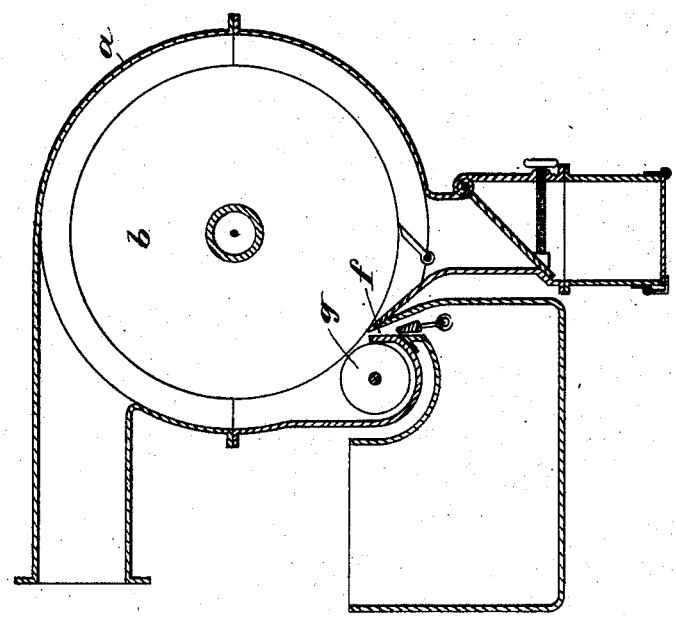
WITNESSES:
INVENTOR
Martin Ekenberg
BY
Henry Connett
ATTORNEY No. 785,600. Patented March 21, 1905.

UNITED STATES PATENT OFFICE.

MARTIN EKENBERG, OF STOCKHOLM, SWEDEN, ASSIGNOR TO MARTIN EKENBERG'S AKTIEBOLAG, OF STOCKHOLM, SWEDEN.

METHOD OF DRYING PASTY SUBSTANCES.

SPECIFICATION forming part of Letters Patent No. 785,600, dated March 21, 1905.

Application filed February 10, 1903. Serial No. 142,720.

*To all whom it may concern:*

Be it known that I, MARTIN EKENBERG, a subject of the King of Sweden and Norway, and a resident of Odengatan 40, Stockholm, in the Kingdom of Sweden, have invented certain new and useful Improvements in Methods of Drying Pasty Substances, of which the following is a specification, reference being had therein to the accompanying drawings.

This invention relates to a method of drying pasty substances and substances which have been deprived of a great part of the moisture and must be subjected to a powerful drying operation for the removal of the rest of the moisture. For that reason the said drying operation is effected in vacuum, the substance being at the same time heated and having the shape of a strip or thin layer.

The said method consists in sucking the pasty substance into a vacuum-pan through a narrow opening in the wall of the said pan and spreading the same over the surface of a heated cylinder rotating in the pan. The said opening is so adjusted that the substance itself forms the tightening means for the same. If the substance has such a firm consistency that it cannot be drawn in by the suction-power exerted by the vacuum, a pressure on the substance may be added to overcome the resistance. At or immediately after the entrance of the substance into the pan it is formed into a strip or thin layer, which is wound onto a heated cylinder rotating in the said pan, from which cylinder the layer is removed after the performance of the drying operation. Owing to the fact that the substance is dried in the shape of a thin layer, the drying operation can be effected in a rapid and perfect manner and the substance scraped off before arriving at the inlet-opening of the pan. In this manner the drying operation can be effected continuously, the dried substance scraped off from the cylinder being preferably discharged from the pan at suitable times by passing the same through locks or in any other suitable manner. By treating substances in the manner described above the drying operation can be effected continuously and at a relatively low temperature. Among substances which can be dried in the manner stated above peat, apple-pulp, and grated potatoes may be mentioned.

In the accompanying drawings, Figure 1 is a cross-section of an apparatus adapted to the carrying out of the said method. Fig. 2 is a section on the line 2 2 of Fig. 1. Figs. 3 and 4 are cross-sections of modified forms of the apparatus.

$a$ is a vacuum-pan. A rotary hollow cylinder $b$ is journaled in the end walls of the said pan and provided with a tubular axle $c$, through which a heating medium—steam or gas—passes into the cylinder at its one end and leaves the same at the other end of the cylinder. The said cylinder $b$ is rotated by suitable means. (Not shown in the drawings.)

$d$ is a receptacle for the substance to be dried. The contracted outlet-opening $e$ of the said receptacle communicates with the pan $a$ through a narrow opening $f$, provided in the wall of the pan. Inside the opening $f$ two rollers $g$ $g$ are journaled in the end walls of the pan $a$, said rollers $g$ $g$ being mounted close to each other, so that the substance passing between them is formed into a strip or thin layer, which is taken up by the cylinder $b$. The forming operation of the substance into a strip may be effected also between one of the rollers $g$ and the cylinder $b$ or between the rollers $g$ $g$ as well as between one of them and the cylinder, the substance being in the last-mentioned case subjected to a preliminary forming operation between the rollers $g$ $g$.

$h$ is a valve mounted in the passage between the receptacle $d$ and the pan $a$, by means of which the quantity of the substance sucked into the pan $a$ is regulated. The said valve is connected, by means of arms $i$, with cranks $k$ $k$, provided on a spindle $l$, having its bearings in the walls of the receptacle $d$ and being adjustable from the outside of the same.

When substances of a firm consistence are to be dried and the atmospheric pressure is not able to press the substance into the pan, the substance may be subjected to the pressure by any suitable means which is sufficient, together with the atmospheric pressure, to cause the substance to pass through the opening $f$. The substance dried on the cylinder $b$ is scraped off by means of knife $m$, mounted in the pan $a$ and bearing against the cylinder $b$. The dried substance falls down into a receiver $n$, from which it is discharged by operating two clack-valves $o\ p$ successively, the latter one, $p$, forming the bottom of a receiver $q$, arranged below the receiver $n$. In this manner the dried substance is removed from the pan $a$ without altering the pressure in the same.

$r$ is a tube leading from the pan $a$ to an evacuator or the like. (Not shown in the drawings.)

If the pasty substance is of a loose consistence and rather homogeneous, it need not be subjected to a preliminary forming operation between the rollers $g\ g$, and one of them can be dispensed with. An apparatus arranged in such a manner is shown in Fig. 3. In this figure the inlet-passage $f$ is substantially tangential to the cylinder $b$, and the substance entering the pan $a$ is formed into a strip or thin layer between the roller $g$ and the cylinder $b$. In other respects the apparatus shown in Fig. 3 is arranged in the same manner as the apparatus shown in Figs. 1 and 2. Also an apparatus of the arrangement shown in Fig. 4 may be employed for the drying of substances of the class last mentioned. In the apparatus shown in the said figure both the rollers $g\ g$ are dispensed with. The one wall $s$ of the inlet-passage $f$, substantially tangential to the cylinder $b$, is extended for some distance along the surface of the cylinder $b$. The substance is formed into a thin layer between the said extension and the cylinder $b$. Other arrangements of the apparatus are the same as shown in Figs. 1 and 2.

The time necessary for the drying operation is controlled by altering the diameter of the cylinder $b$ or the rotary speed of the said cylinder. Besides, the said time is dependent on the temperature of the heating medium, the thickness of the layer of the pasty or plastic substance, the amount of moisture contained in the substance, the rarefying of the air in the pan $a$, and other circumstances.

Having now described my invention, what I claim as new, and desire to secure by Letters Patent, is—

1. The herein-described method of drying pasty or plastic substances on a heated body continuously moving in a vacuum-chamber, which consists in feeding the said substance in a continuous manner by pressure through a passage leading to the said chamber, the substance serving to prevent the entry of air at said passage, and in forming the said substance into a thin band which is then taken up by the heated body.

2. The herein-described method of drying plastic or pasty substances on a heated body continuously moving in a vacuum-chamber, which consists in forcing the said substance in a continuous manner and in an upward direction through a narrow passage to the said heated body, the substance being formed into a thin band in its movement under the feeding pressure.

In witness whereof I have hereunto signed my name in the presence of two subscribing witnesses.

MARTIN EKENBERG.

Witnesses:
ERNST SVANQVISE,
ROBERT APELGREN.